United States Patent Office 3,507,518
Patented Apr. 21, 1970

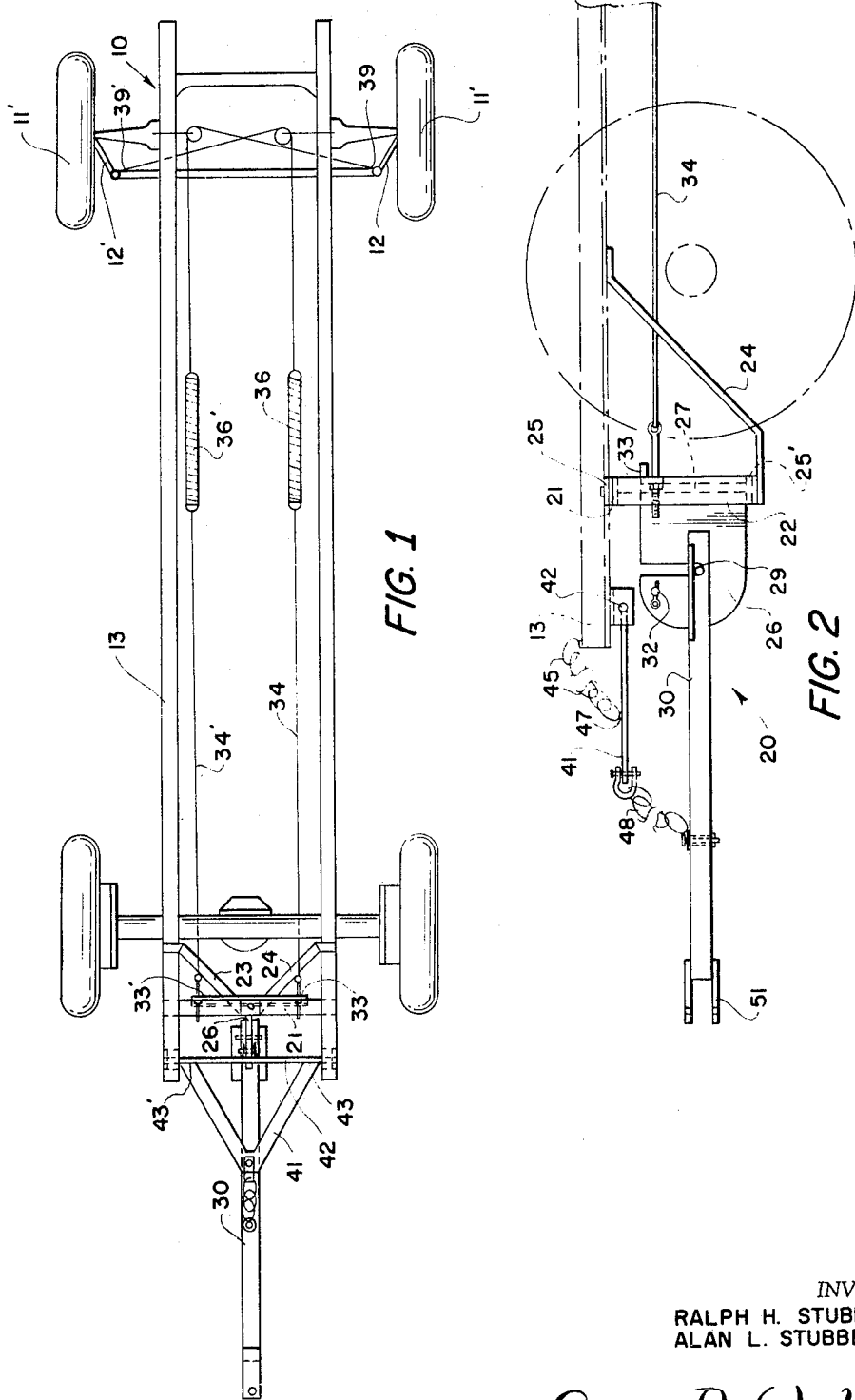

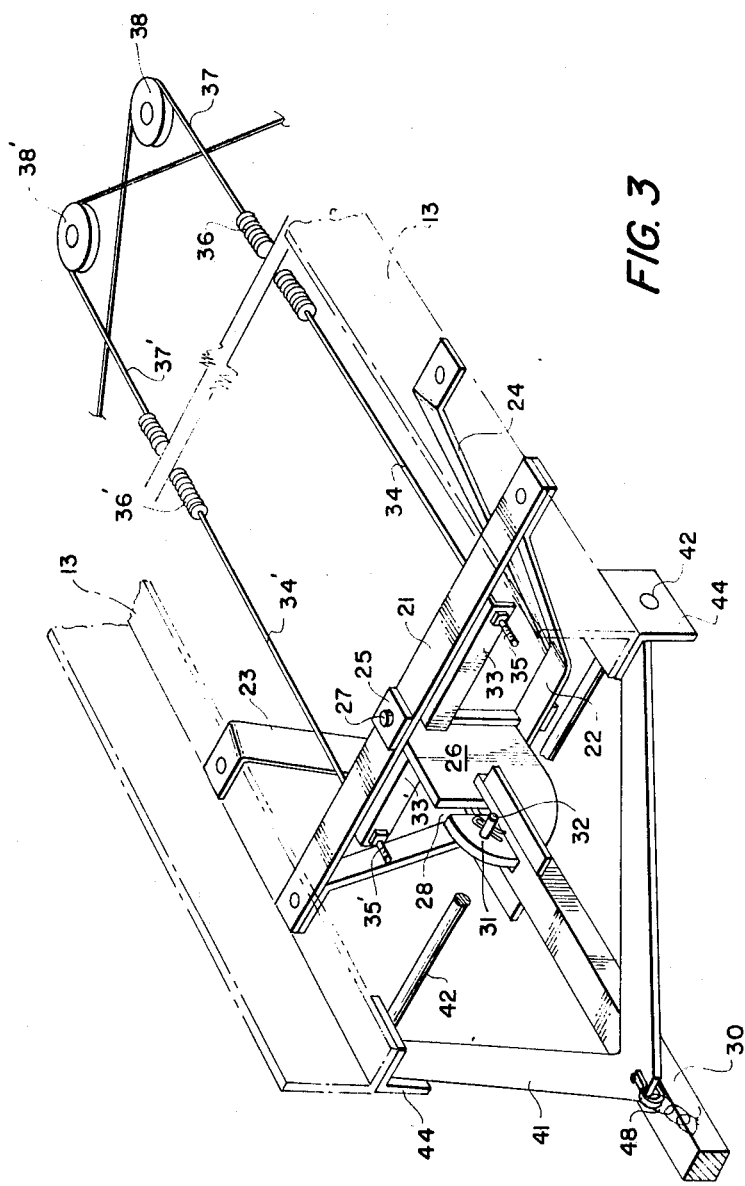

3,507,518
REAR TOWING HITCH AND STEERING ASSEMBLY FOR TRUCKS
Ralph H. Stubbendick and Alan L. Stubbendick, both of Avoca, Nebr. 68307
Filed Sept. 1, 1967, Ser. No. 665,102
Int. Cl. B62d *13/04*
U.S. Cl. 280—444                      10 Claims

ABSTRACT OF THE DISCLOSURE

A rear towing hitch and steering assembly, for use on a truck which is to be towed backwardly, comprises a bracket assembly attached to the rear of the truck frame, a hitch and steering member pivotally attached to the bracket assembly and connected to the steering mechanism of the front wheels of the truck by means of spring-interrupted cables, and a tongue extension for removable engagement with the hitching and steering member, whereby when the truck is towed backwardly the front wheels of the truck are steered in response to a pivotal movement of the hitching means by the tongue. An A-frame drawbar is attached to the truck frame and to the tongue to assist in executing short turns. The A-frame drawbar is mounted above the tongue and is vertically pivotable to compensate for ditches, depressions, etc. The invention is particularly useful in preparing and transporting silage.

BACKGROUND OF THE INVENTION

The preparation and storage of silage involves at least two distinct steps insofar as concerned here. First, the corn or hay, etc., must be chopped, preferably in the field, and then the silage must be transported to the silo and stored. In the past, wagons were pulled behind the tractor and chopper, with the chopped material being deposited directly into the wagons. However, this either limited operations to those fields close to home, or required much time on the road due to the inherent slowness of the equipment.

Modern commercial plants often use trucks in similar operations by loading the trucks onto trailers, again pulling the trailer behind the chopper until the truck box has been blown full, and then driving the truck off the trailer and to further processing. This latter method is not suitable for all operations, however, mainly because the weight of a truck-trailer is so great, but also because the method is very expensive.

SUMMARY OF THE INVENTION

The present invention provides a different approach to the problem. By devising a novel hitch and steering device it is possible to turn the truck around and pull the truck backwardly behind the chopper, feeding the chopped material directly into the truck box, thus eliminating the trailer. When the truck box is filled the truck is easily detached and free to be used to transport the silage to the silo.

In the present invention a hitch and steering bracket or equivalent structure is attached to the underside of the frame at the rear of the truck. The hitch and steering member itself is integrally attached to a vertical pivot pin which is received by the bracket whereby the hitch and steering member is free to pivot about the pivot pin. Extending from the main body of the hitch and steering member are a pair of arms, one from each side. To each of these arms is connected a cable, the opposite end of which is connected through a spring and pulley arrangement to the steering mechanism of the front wheels. A tongue is removably secured to the hitch, and a floating drawbar is pivotally attached to the truck frame for vertical pivotal movement from a position above the tow hitch. A chain is connected between the floating drawbar and an intermediate point on the tongue to assist in pulling the truck through a short turn. The floating capability of the drawbar compensates for ditches, depressions, etc. encountered during the backward towing and steering operation.

In operation the tongue extension is connected to and pulled by a prime mover. As the prime mover turns, the hitch and steering member will pivot about the axis of the pivot pin. This movement will be transmitted to the front wheel steering mechanism, causing the wheels to be turned in a direction complementary to the turning of the prime mover so that the turning is facilitated. The truck is steered through the turn rather than being dragged. When making a short turn, the chain connection between the tongue and the drawbar tightens to assist the turning maneuver.

It is thus an object of the present invention to provide an arrangement for backwardly towing a truck without damaging the front steering system.

Another object of this invention is to provide a simple means for modifying an ordinary truck so that it can be towed backwardly through a field for loading, and then easily detached to be driven on the road.

Other objects, advantages and features of the present invention will become apparent to those skilled in the art from the following detailed description of a preferred embodiment of the invention, taken with reference to the accompanying drawings.

BRIEF DESCRIPTION OF THE DRAWINGS

FIGURE 1 is a top plan view showing an embodiment of the invention generally as mounted on a standard truck chassis.

FIGURE 2 is a fragmentary enlarged side elevation showing the details of the assembly.

FIGURE 3 is a fragmentary perspective view of the embodiment shown in FIGURES 1 and 2, and illustrating further details.

DESCRIPTION OF THE PREFERRED EMBODIMENT

Referring to the drawings, a standard truck chassis is shown at 10. The chassis includes front wheels 11 and 11', steering arms 12 and 12', and frame 13.

The hitch and steering assembly of the present invention is generally designated 20 in FIGURES 2 and 3. A bracket assembly comprising upper member 21, lower member 22 and side supporting members 23 and 24 are removably attached to the frame 13 of the truck chassis by bolts or other means. Located in the center of the upper and lower bracket members 21 and 22 are holes 25 and 25' for receipt of the pivot pin of the hitch and steering member 26.

At one end of the hitch 26 is welded or otherwise securely attached a pivot pin 27 which extends vertically between the upper and lower bracket elements 21 and 22 and is received by holes 25 and 25'. In this manner hitch 26 is free to rotate about the axis of pivot pin 27. At the other end of hitch 26 is a slot 28 designed to receive the connecting stud 29 of the tongue 30. Hole 31 in hitch 26 receives safety pin 32 which is inserted in hole 31 and locked with cotter pins to prevent the accidental removal of stud 29 from the slot which would release the tongue 30 from the hitch 26.

Extending from hitch 26 are arms 33 and 33'. At the extreme end of each arm 33, 33' a hole is drilled to receive the end of cables 34 and 34' which are attached as at 35 and 35' by conventional eye bolts or other well known means. Cables 34 and 34' extend to coil springs 36 and 36' and are attached to the ends thereof. From the other end of the springs 36 and 36' the cables continue as at 37 and 37'. Their direction is reversed by means of pulleys 38 and 38', and the cables are then attached to the steering arms of the vehicle at 39 and 39' as best shown schematically in FIGURE 1. These connections at 39 and 39' may be made by any well known means.

Again at the rear of the truck frame an additional element, a floating drawbar 41, is attached. Rod 42 is welded or otherwise secured to the end of the arms making up drawbar 41 at 43 and 43'. This is best illustrated in FIGURE 1. Rod 42 is received by brackets 44 and 44' which are welded or otherwise secured to frame 14 in such a way that the drawbar is free to rotate vertically. The movement of drawbar 41 is limited by a chain or other device 45 running from the frame to the drawbar at 47. The drawbar 41 is further connected to the tongue 30 by means of another chain 48. Chain 48 permits pivotal movement of tongue 30 and hitch and steering member 26, but limits the maximum pivotal movement of these members. At 51 is provided any conventional means for attaching the tongue to a prime mover such as a tractor.

In operation, the rear end of the truck is connected to the prime mover by means of the tongue and connecting means 51. The truck is then pulled backwardly by the prime mover. As the prime mover turns, the tongue will also turn laterally, moving hitch 26 such that it pivots about its pivot pin 27. If for example hitch 26 turns toward bracket 44, tension will be placed on cable 34' which will initially be taken up by spring 36'. This tension will then be transmitted through cable 37' to turn the wheels 11 and 11' outwardly, steering the vehicle in the direction of the prime mover. The spring in the line of the cable acts to buff shocks between the steering assembly and the front wheels. This prevents damage to the front steering mechanism which would be very probable when the vehicle is loaded.

The floating mounting of drawbar 41 acts to compensate for rough terrain such as ditches.

When making a short turn, the chain from the floating drawbar to the tongue tightens and helps pull the truck around to make the turn. Without this chain it would be difficult if not impossible to make a short turn.

When the truck is full or it is otherwise no longer desirable to tow the truck, the truck can be removed very simply from the prime mover by release of attaching means 51, and the tongue 30 can be easily released from hitch 26 by removing safety pin 32 and then lifting tongue 30 to remove stud 29 from slot 28.

It should be apparent that many other variations and modifications are possible within the spirit and scope of the invention.

What is claimed and desired to be protected by Letters Patent of the United States is:

1. A tow hitch and steering assembly for use in towing a standard four-wheel, motor driven truck backwardly, comprising a hitch and steering member pivotally attached to the rear of the truck for pivotal movement about a vertical pivot axis; cable means respectively connected to said hitch and steering member at points disposed on opposite sides of said vertical pivot axis and to the steering arm means of the front wheels of the truck for effecting steering movement of the front wheels in response to pivotal movement of said hitch and steering member; means comprising a tongue member for connection at one end to said hitch and steering member and at the other end to a tow vehicle for connecting said hitch and steering member to a tow vehicle; and means connecting an intermediate point on said tongue to points on the rear of the truck on opposite sides of said hitch and steering member for automatically transmitting an assisting turning torque from the tongue to the truck upon a predetermined extent of pivotal movement of said tongue and said hitch and steering member about said vertical pivot axis during execution of a turn; whereby the truck can be towed backwardly and steered automatically upon turning of the tow vehicle.

2. Apparatus as claimed in claim 1 wherein said cable means have springs incorporated therein for absorbing shocks along the cable means.

3. Apparatus as claimed in claim 1 wherein said last mentioned means comprises a drawbar connected to the truck above said hitch and steering member, and a normally-relaxed flexible tension member connecting said drawbar to an intermediate point on said tongue for pulling said drawbar and the truck toward the tongue when executing a short turn.

4. Apparatus as set forth in claim 3 wherein said drawbar is connected to the truck for pivotal movement about a horizontal axis to compensate for depressions and the like in the terrain over which the truck may be towed.

5. Apparatus as set forth in claim 1 further comprising a hitch and steering bracket assembly connected to the rear of the truck frame and comprising at least upper and lower horizontal members having vertically disposed holes formed therein for receiving a vertical pivot pin forming said vertical pivot axis.

6. Apparatus as claimed in claim 1 wherein said hitch and steering member includes a vertical pivot pin, arms extending outwardly from said pivot pin and transversely of the truck, and means defining a vertical slot for receiving a tongue used in pulling and steering the truck, said cable means being connected to said arms adjacent the outer ends thereof.

7. A tow hitch and steering assembly for use in towing a standard four-wheel, motor driven truck backwardly, comprising means pivotally attached to the rear of the truck for pivotal movement about a vertical pivot axis, and adapted for connection to a tow vehicle; linkage means connected to the steering means of the front wheels of the truck and to said pivotal means for effecting steering movement of the front wheels in response to pivotal movement of said pivotal means; and means connected to points on the rear of the truck and operatively coupled to said pivotal means for automatically transmitting an assisting turning torque from said pivotal means to the truck upon a predetermined extent of pivotal movement of said pivotal means about said vertical pivot axis during execution of a turn; whereby the truck can be towed backwardly and steered automatically upon turning of the tow vehicle.

8. Apparatus as claimed in claim 7 wherein said pivotal means includes a tongue member and said torque transmitting means comprises flexible means connected to points on the rear of the truck and to point on said tongue member.

9. Apparatus as claimed in claim 8 wherein said pivotal means further includes a pivotally mounted hitch and steering member to which said tongue is releasably coupled at one end.

10. A tow hitch and steering assembly for use in towing a standard four-wheel, motor driven truck backwardly, comprising a bracket assembly connected to said truck adjacent the rear end thereof, said bracket assembly comprising upper and lower members extending transversely of the center line of the truck; a hitch and steering member pivotally mounted on and between said upper and lower members for pivotal movement about a vertical pivot axis, said hitch and steering member including a vertical pivot pin forming said pivot axis, arms extending outwardly from said pivot pin and transversely of the truck, a generally vertically disposed plate member connected to said pivot pin and extending rearwardly therefrom, and means defining a generally vertical slot extending downwardly from the upper edge of said plate member; a tongue member having a bifurcated end portion with a stud member connecting the bifurcations adjacent the end of the tongue, said bifurcation straddling said plate member, and said stud member being disposed in said slot, whereby movement of said tongue member in a generally horizontal plane pivots said plate member about said vertical pivot pin; linkage means respectively connected to said arms adjacent the outer ends thereof and to the steering assembly for the front wheels of the truck for effecting steering movement of the front wheels in response to pivotal movement of said hitch and steering member; and means for connecting said tongue to a tow vehicle; whereby the truck can be towed backwardly and steered automatically upon turning of the tow vehicle.

References Cited

UNITED STATES PATENTS

| | | | |
|---|---|---|---|
| 2,433,269 | 12/1947 | Fellabaum | 280—426 |
| 2,673,091 | 3/1954 | Planalp | 280—103 |
| 2,702,193 | 2/1955 | Taylor et al. | 280—103 |
| 3,053,551 | 9/1962 | Kirkpatrick | 280—444 |

FOREIGN PATENTS

| | | |
|---|---|---|
| 979,565 | 12/1950 | France. |
| 959,973 | 3/1957 | Germany. |

LEO FRIAGLIA, Primary Examiner

U.S. Cl. X.R.

56—1, 24; 280—103